(12) United States Patent
Nakamura et al.

(10) Patent No.: US 9,043,442 B2
(45) Date of Patent: May 26, 2015

(54) CONTROL METHOD OF INFORMATION PROCESSING SYSTEM, SERVER DEVICE, AND TERMINAL DEVICE

(71) Applicant: FUJITSU LIMITED, Kawasaki-shi, Kanagawa (JP)

(72) Inventors: Yosuke Nakamura, Kawasaki (JP); Kazuaki Nimura, Kawasaki (JP); Hidenobu Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 180 days.

(21) Appl. No.: 13/668,663

(22) Filed: Nov. 5, 2012

(65) Prior Publication Data
US 2013/0246579 A1 Sep. 19, 2013

(30) Foreign Application Priority Data

Mar. 16, 2012 (JP) ................................ 2012-059637

(51) Int. Cl.
*H04L 29/08* (2006.01)
*G06F 21/10* (2013.01)

(52) U.S. Cl.
CPC ................ *H04L 67/34* (2013.01); *G06F 21/10* (2013.01); *G06F 2221/2137* (2013.01)

(58) Field of Classification Search
CPC .................... H04L 67/1097; H04L 29/08549; H04L 67/34; G06Q 30/0601
USPC ........................................................ 709/219
See application file for complete search history.

(56) References Cited

U.S. PATENT DOCUMENTS

| 6,832,230 | B1 | 12/2004 | Zilliacus et al. | |
|---|---|---|---|---|
| 7,343,297 | B2 * | 3/2008 | Bergler et al. | ................... 705/59 |
| 2002/0123336 | A1 | 9/2002 | Kamada | |
| 2004/0160911 | A1 | 8/2004 | Zilliacus et al. | |
| 2004/0181591 | A1 * | 9/2004 | Yu et al. | ........................ 709/217 |
| 2005/0083877 | A1 | 4/2005 | Zilliacus et al. | |
| 2007/0077925 | A1 | 4/2007 | Hiyama | |
| 2011/0125602 | A1 | 5/2011 | Kamada | |

FOREIGN PATENT DOCUMENTS

| EP | 1 130 495 A2 | 9/2001 |
|---|---|---|
| JP | 2006-3996 | 1/2006 |
| JP | 2007-34754 | 2/2007 |
| JP | 2011-23024 | 2/2011 |

OTHER PUBLICATIONS

Extended Search Report issued Jun. 21, 2013 in European Application No. 12191972.4.

* cited by examiner

*Primary Examiner* — Yves Dalencourt
(74) *Attorney, Agent, or Firm* — Oblon, McClelland, Maier & Neustadt, L.L.P.

(57) ABSTRACT

A control method of an information processing system that includes a server device that distributes an application and a terminal device that communicates with the server device includes causing the server device to execute a first process including determining an expiration date of the application based on a type of the application, and transmitting the application and the expiration date to the terminal device, and causing the terminal device to execute a second process including receiving the application and the expiration date from the server device, and deleting the application received from the server device based on the expiration date received from the server device.

9 Claims, 11 Drawing Sheets

BUSINESS TRIP REQUEST

| | |
|---|---|
| BUSINESS TRAVELER | NIPPON TARO |
| DEPARTURE PLACE | MUSASHI-NAKAHARA |
| DESTINATION PLACE | TOKYO |
| CONTENTS | **** |
| AUTHORIZER | MANAGER yy IN ** DEPARTMENT |

[APPROVAL] [DENIAL]

102

BUSINESS TRIP REQUEST

| | |
|---|---|
| 1020 — BUSINESS TRAVELER | |
| 1022 — DEPARTURE PLACE | |
| 1024 — DESTINATION PLACE | |
| 1026 — CONTENTS | |
| 1028 — AUTHORIZER | |

[APPROVAL] [DENIAL]

104

| |
|---|
| NIPPON TARO |
| MUSASHI-NAKAHARA |
| TOKYO |
| **** |
| MANAGER yy IN ** DEPARTMENT |

| TYPE INFORMATION | INITIAL VALUE |
|---|---|
| BANK ACCOUNT CHANGE NOTIFICATION | 5 MINUTES |
| ADDRESS CHANGE NOTIFICATION | 10 MINUTES |
| BUSINESS TRIP REQUEST | 60 MINUTES |

| PERSONAL DATA | SUBTRACTION VALUE |
|---|---|
| BUSINESS TRAVELER | 3 MINUTES |
| DEPARTURE PLACE | 0 MINUTE |
| DESTINATION PLACE | 5 MINUTES |
| CONTENTS | 10 MINUTES |
| AUTHORIZER | 3 MINUTES |
| BUSINESS TRAVELER & DESTINATION PLACE | 7 MINUTES |

122 124

US 9,043,442 B2

CONTROL METHOD OF INFORMATION PROCESSING SYSTEM, SERVER DEVICE, AND TERMINAL DEVICE

FIELD

The embodiments discussed herein are related to a control method of an information processing system, a server device, and a terminal device.

BACKGROUND

The spread of smartphones, or mobile terminals exhibiting high performance comparable with personal computers has been advancing. In addition, due to 3G/Long Term Evolution (LTE)/plenty of hotspots, etc., an environment in which the smartphone may be connected to a network at all times is becoming more common.

By taking advantage of such an environment, an information processing system, which transmits an application and data to a mobile terminal from an application server, is provided. In the system, the application server distributes an application at a desired timing, the application is executed in the mobile terminal, and the application and data are deleted by the application server after the execution is over. In the information processing system, the application server performs the distribution of an application to the mobile terminal and the deletion of an application, etc. from the mobile terminal. Once an application has been transmitted from the application server to the mobile terminal, the application is executable in the mobile terminal even when the connection between the mobile terminal and the application server is disconnected. When the execution of the application in the mobile terminal is over, the application server deletes the application in the mobile terminal without causing a user to delete the application. Thus, information leakage from the mobile terminal is reduced.

However, when the network connection is disconnected after an application is transmitted from the application server to the mobile terminal, the application server is not allowed to delete the application stored in the mobile terminal, so that the risk of the information leakage is increased when the user has lost the mobile terminal.

In order to give priority to the maintenance of security, the mobile terminal may be configured to immediately delete an application of the mobile terminal in case the network connection is disconnected after the application is transmitted from the application server to the mobile terminal. However, for example, when the network connection is temporarily disconnected, the user undesirably downloads the application from the application server to the mobile terminal again after the network connection is reestablished, so that the user may think it troublesome to download the application.

Japanese Laid-open Patent Publication Nos. 2006-3996 and 2011-23024 are examples of the related art.

SUMMARY

Accordingly, it is an object in one aspect of the invention to provide an information processing system that may execute an application while maintaining the security without causing the user to feel difficulty of the execution of the application.

According to an aspect of the invention, a control method of an information processing system that includes a server device that distributes an application and a terminal device that communicates with the server device includes causing the server device to execute a first process including determining an expiration date of the application based on a type of the application, and transmitting the application and the expiration date to the terminal device, and causing the terminal device to execute a second process including receiving the application and the expiration date from the server device, and deleting the application received from the server device based on the expiration date received from the server device.

BRIEF DESCRIPTION OF DRAWINGS

FIG. 2 is a diagram illustrating an application package;
FIG. 6 is a diagram illustrating a type information table;
FIG. 7 is a diagram illustrating a personal data table.

DESCRIPTION OF EMBODIMENTS

An information processing system according to an embodiment is described.

Figure 1:
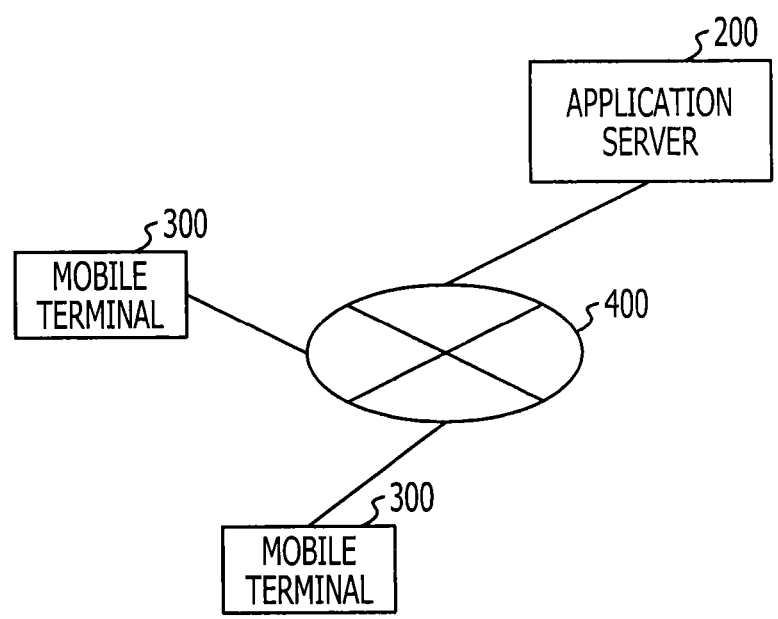
FIG. 1 is a first diagram illustrating an information processing system.

FIG. 1 is a first diagram illustrating the information processing system according to the embodiment. The information processing system includes an application server 200, a network 400, and a plurality of mobile terminals 300. The application server 200 and each of the plurality of mobile terminals 300 are connected to each other through the network 400.

The application server 200 registers an application package, and transmits the application package to the mobile terminal 300. The mobile terminal 300 executes the application package transmitted from the application server 200.

FIG. 2 is a diagram illustrating an application package according to the embodiment. In the embodiment, a business trip request application is described as an example of an application package 100. The application package 100 includes a template 102 and personal data 104. The template 102 is a template of the application. The personal data 104 is personal data that is applied to the template 102.

The template 102 includes items of business traveler 1020, departure place 1022, destination place 1024, contents 1026, and authorizer 1028. In the mobile terminal 300, the application package 100 is executed and the items of business traveler 1020, etc. are filled in by the user.

The personal data 104 is information input to the items of business traveler 1020, etc. of the template 102. The personal data includes, for example, "Nippon Taro" that is for the item of business traveler 1020, "Musashi-nakahara" that is for the item of departure place 1022, "Tokyo" that is for the item of destination place 1024, "**" that are for the item of contents 1026, and "Manager yy in  department" that is for the item of authorizer 1028.

Figure 3:
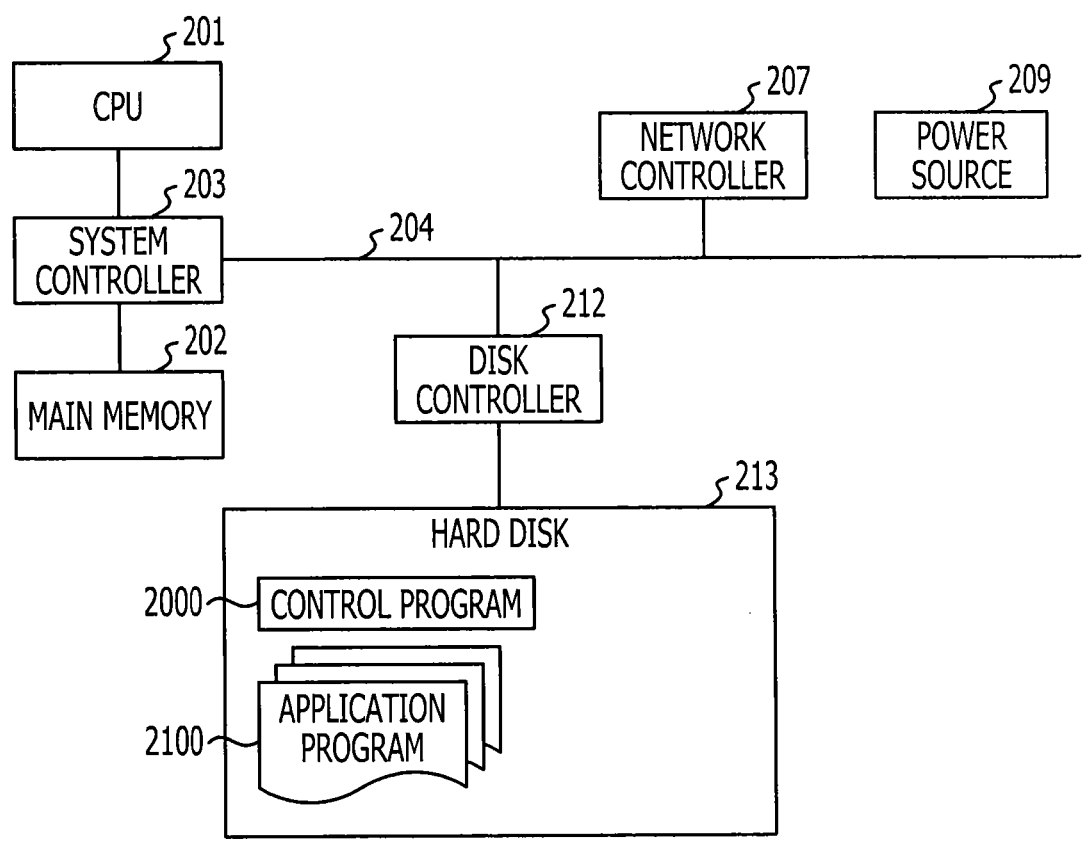
FIG. 3 is a diagram illustrating an application server.

FIG. 3 is a diagram illustrating the application server according to the embodiment. The application server 200 includes a central processing unit (CPU) 201, a main memory 202, a system controller 203, a bus 204, a network controller 207, a power source 209, a disk controller 212, and a hard disk 213. The application server 200 is controlled by the CPU 201.

The system controller 203 is connected to the CPU 201 and the main memory 202. The system controller 203 controls data transfer between the CPU 201 and the main memory 202 and data transfer between the CPU 201 and the bus 204. In addition, the network controller 207 and the disk controller 212 are connected to the system controller 203 through the bus 204.

The main memory 202 temporarily stores at least a part of a program of an OS and an application program that are executed by the CPU 201. In addition, the main memory 202 stores various pieces of data that are desired for processing by the CPU 201. For example, a random access memory (RAM) is used for the main memory 202.

The hard disk 213 is connected to the disk controller 212. The disk controller 212 controls the hard disk 213. The hard disk 213 stores an application program 2100 that is executed on the main memory 202 by the CPU 201, a control program 2000 that causes the CPU 201 to perform control such as calling of the application program 2100, and an application package and various pieces of data that are transmitted to the mobile terminal 300.

The network controller 207 is connected to the mobile terminal 300 through the network 400 illustrated in FIG. 1, and performs transmission and reception of the application package and various pieces of data to and from the mobile terminal 300.

The power source 209 supplies electric power to each of the pieces of hardware in the application server 200 through a power wire (not illustrated).

By such pieces of hardware, a processing function of the application server 200 may be achieved.

Figure 4:
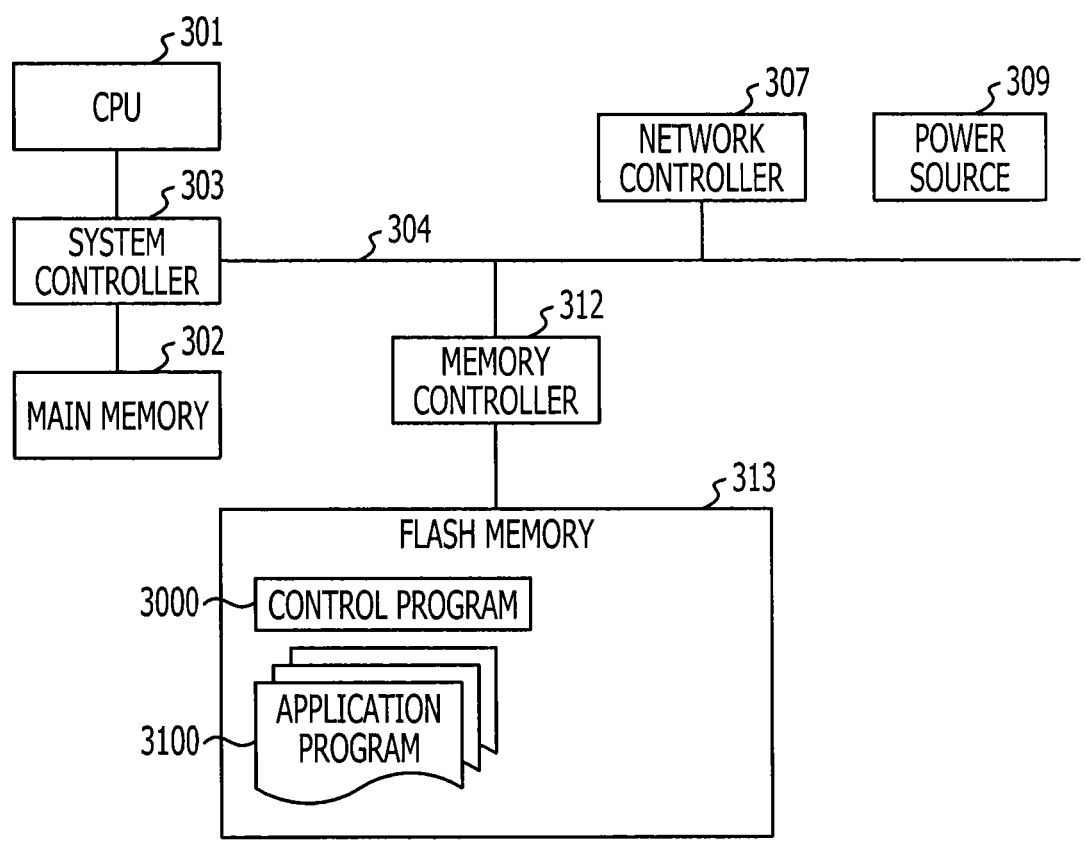
FIG. 4 is a diagram illustrating a mobile terminal.

FIG. 4 is a diagram illustrating the mobile terminal according to the embodiment. The mobile terminal 300 includes a CPU 301, a main memory 302, a system controller 303, a bus 304, a network controller 307, a power source 309, a memory controller 312, and a flash memory 313. The mobile terminal 300 is controlled by the CPU 301.

The system controller 303 is connected to the CPU 301 and the main memory 302. The system controller 303 controls data transfer between the CPU 301 and the main memory 302 and data transfer between the CPU 301 and the bus 304. In addition, the network controller 307 and the memory controller 312 are connected to the system controller 303 through the bus 304.

The main memory 302 temporarily stores at least a part of a program of an OS and an application program that are executed by the CPU 301. In addition, the main memory 302 stores various pieces of data that are desired for processing by the CPU 301. For example, a RAM is used for the main memory 302.

The flash memory 313 is connected to the memory controller 312. The memory controller 312 controls the flash memory 313. The flash memory 313 stores an application program 3100 that is executed on the main memory 302 by the CPU 301, a control program 3000 that causes the CPU 201 to perform control such as calling of the application program 3100, and various pieces of data. In addition, the flash memory 313 stores an application package, etc. received from the application server 200.

The network controller 307 is connected to the application server 200 through the network 400 illustrated in FIG. 1 and performs transmission and reception of data to and from the application server 200.

The power source 309 supplies electric power to each of the pieces of hardware in the mobile terminal 300 through a power wire (not illustrated).

By such pieces of hardware, a processing function of the application server 300 may be achieved.

Figure 5:
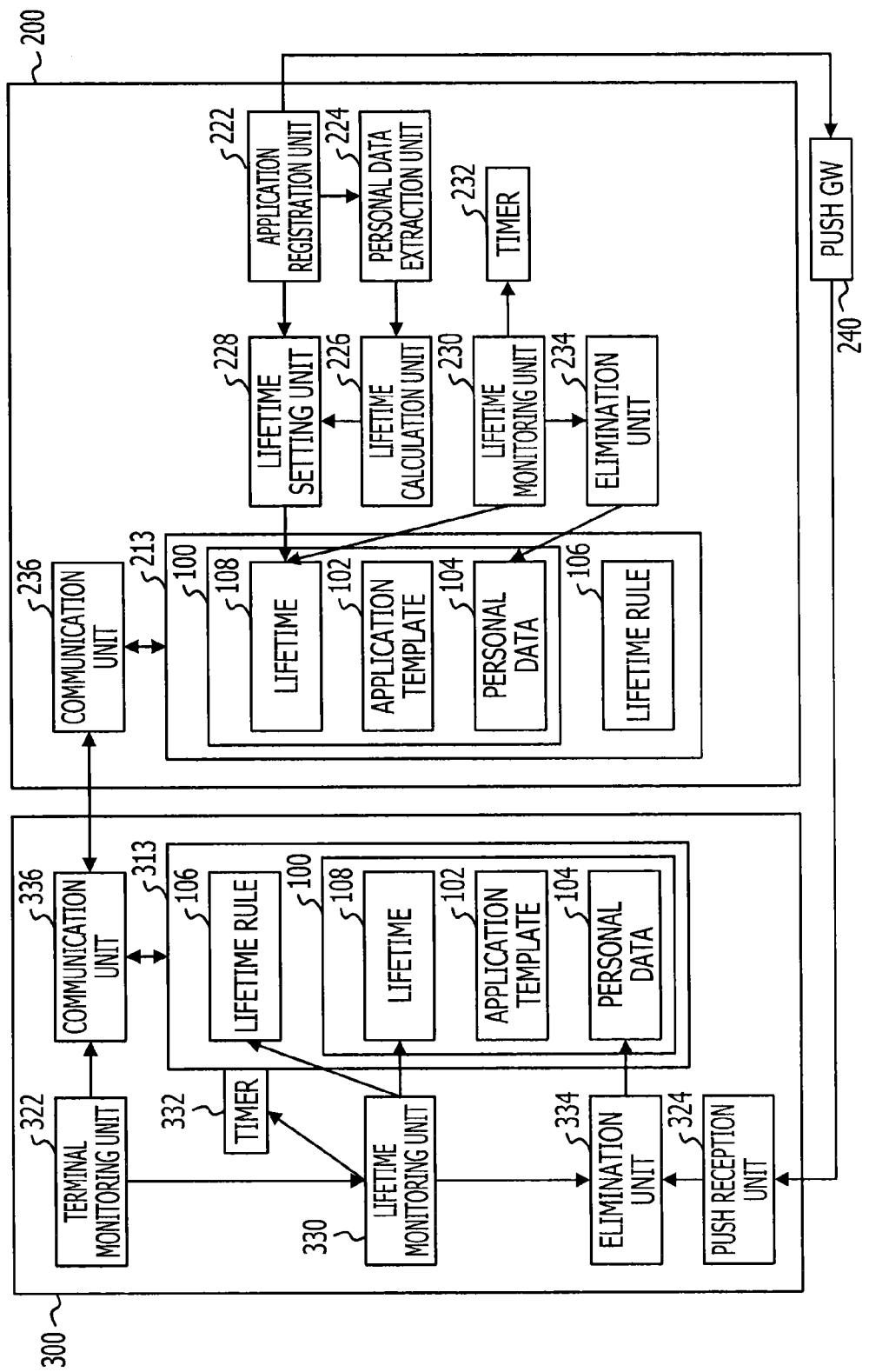
FIG. 5 is a second diagram illustrating the information processing system.

FIG. 5 is a diagram illustrating the information processing system according to the embodiment. Each block illustrated in FIG. 5 may be achieved when the CPU 201 of the application server 200 executes the application program 2100 on the main memory 202 and when the CPU 301 of the mobile terminal 300 executes the application program 3100 on the main memory 302.

The application server 200 includes an application registration unit 222, a personal data extraction unit 224, a lifetime calculation unit 226, a lifetime setting unit 228, a lifetime monitoring unit 230, a timer 232, the hard disk 213, and a communication unit 236. The hard disk 213 stores the application package 100 and a lifetime rule 106.

The application registration unit 222 receives the application package 100, for example, from an external server and registers the received application package 100 to the hard disk 213. The personal data extraction unit 224 extracts personal data from the application package 100 received in the application registration unit 222. In addition, the application registration unit 222 transmits a push message to the mobile terminal 300 through a PUSH GW 240.

The lifetime calculation unit 226 calculates an expiration date of the application package 100 based on the personal data extracted in the personal data extraction unit 224.

The lifetime calculation unit 226 determines an initial value of the expiration date depending on the type of an application package by referring to a type information table 110.

FIG. 6 is a diagram illustrating the type information table. The type information table 110 includes type information 112 and an initial value 114. The type information 112 indicates the type of an application package. The initial value 114 indicates an initial value of an expiration date of the application package indicated by the type information 112. In an application package of bank account change notification, an initial value is set, for example, at a small value such as "5 minutes" because a bank account number is input by the user. In addition, in an application package of address change notification, an initial value is set, for example, at a greater value, such as "10 minutes", than that of the application package of bank account change notification because an address that is input by the user is not important information as compared with the bank account number. In addition, in an application package of business trip request, an initial value is set, for example, at a greater value, such as "60 minutes", than that of the application package of account change notification and the application package of address change notification because a mail addresses, etc. that are input by the user are not important information as compared with the bank account number and the address.

After that, the lifetime calculation unit 226 determines an expiration date of the application package by extracting the number of pieces of personal data from the application package and referring to a personal data table 120.

FIG. 7 is a diagram illustrating the personal data table. The personal data table 120 includes personal data 122 and a subtraction value 124. The personal data 122 indicates pieces of personal data that are pieces of personal information included in the application package 100. The subtraction value 124 indicates a subtraction values associated with the pieces of personal data 122. The pieces of personal information are weighted by setting subtraction values depending on the importance of personal data, that is, setting a subtraction value of personal data "business traveler" at "3 minutes", setting a subtraction value of personal data "departure place" at "0 minutes", setting a subtraction value of personal data "destination place" at "5 minutes", setting a subtraction value of personal data "contents" at "10 minutes", and setting a subtraction value of personal data "authorizer" at "3 minutes". In addition, when both of the personal data "business traveler" and the personal data "destination place" are included in the application package 100, the subtraction value is set at a greater value, such as "7 minutes", than that of each of the personal data "business traveler" and the personal data "destination place" because the combined pieces of personal data becomes important information.

The lifetime calculation unit 226 calculates an expiration date of the application package by subtracting a subtraction value corresponding to a personal data included in the application package from an initial value of the expiration date of the application package.

The lifetime setting unit 228 sets an expiration date to the application package 100 based on the expiration date calculated by the lifetime calculation unit 226.

The application registration unit 222 stores the application package 100 to which the expiration date is set, in the hard disk 213. The application package 100 stored in the hard disk 213 is deployed to the main memory 202 and executed by the CPU 201. The application registration unit 222 transmits the application package 100 to which a lifetime 108 is set and a lifetime rule that are stored in the hard disk 213, to a communication unit 316 of the mobile terminal 300 through the communication unit 236.

The lifetime setting unit 228 sets a lifetime rule so that the expiration date of the application package 100 is decreased, for example, by Y times the normal when the communication connection between the mobile terminal 300 and the application server 200 is disconnected.

The lifetime setting unit 228 sets an expiration date of the application package stored in the mobile terminal 300 at the expiration date of the application package stored in the application server 200 when the mobile terminal 300 and the application server 200 are reconnected to each other after the communication connection between the mobile terminal 300 and the application server 200 has been disconnected. In addition, the lifetime setting unit 228 deletes, for example, a piece of personal data per Z minutes when an application package is not operated for Z minutes after the application package has been started in the mobile terminal 300. In this case, the lifetime setting unit 228 may delete pieces of personal data in order of importance by weighting the pieces of personal data beforehand.

The lifetime monitoring unit 230 determines whether or not there is the remaining of the expiration date by referring to the expiration date set to the application package 100, based on a value indicated by the timer 232. When there is no remaining of the expiration date of the application package 100, the lifetime monitoring unit 230 reports, to an elimination unit 234, that the expiration date of the application package 100 has become expired. When the elimination unit 234 receives the report from the lifetime monitoring unit 230, the elimination unit 234 deletes the expired application package 100 that is stored in the hard disk 213.

The communication unit 236 transmits the application package 100 and the lifetime rule 106 to the mobile terminal 300.

The mobile terminal 300 includes a communication unit 336, a push reception unit 324, an elimination unit 334, a lifetime monitoring unit 330, a terminal monitoring unit 322, a timer 332, and the flash memory 313.

The push reception unit 324 receives a message from the PUSH GW 240, interrupts the message, and issues an instruction of the execution to a unit that performs the processing.

The communication unit 336 receives the application package 100 to which the expiration date is set and the lifetime rule 106, from the application server 200. The communication unit 316 stores the application package 100 and the lifetime rule 106 that are received from the application server 200 in the flash memory 31.

The terminal monitoring unit 322 monitors the state of the mobile terminal and reports the terminal state to the lifetime monitoring unit 330. The lifetime monitoring unit 330 changes the expiration date that is set to the application package 100, based on the terminal state reported from the terminal monitoring unit 322 by referring to the lifetime rule 106. In addition, the lifetime monitoring unit 330 determines whether or not there is the remaining of the expiration date by referring the expiration date that is set to the application package 100 and changed by the lifetime monitoring unit 330, based on a value indicated by the timer 332. When there is no remaining of the expiration date of the application package 100, the lifetime monitoring unit 330 reports, to the elimination unit 334, that the expiration date of the application package 100 has become expired. When the elimination unit 334 receives the report from the lifetime monitoring unit 330, the elimination unit 334 deletes personal data included in the expired application package 100 stored in the flash memory 313. The elimination unit 334 may delete the application package 100 itself.

Figure 8:
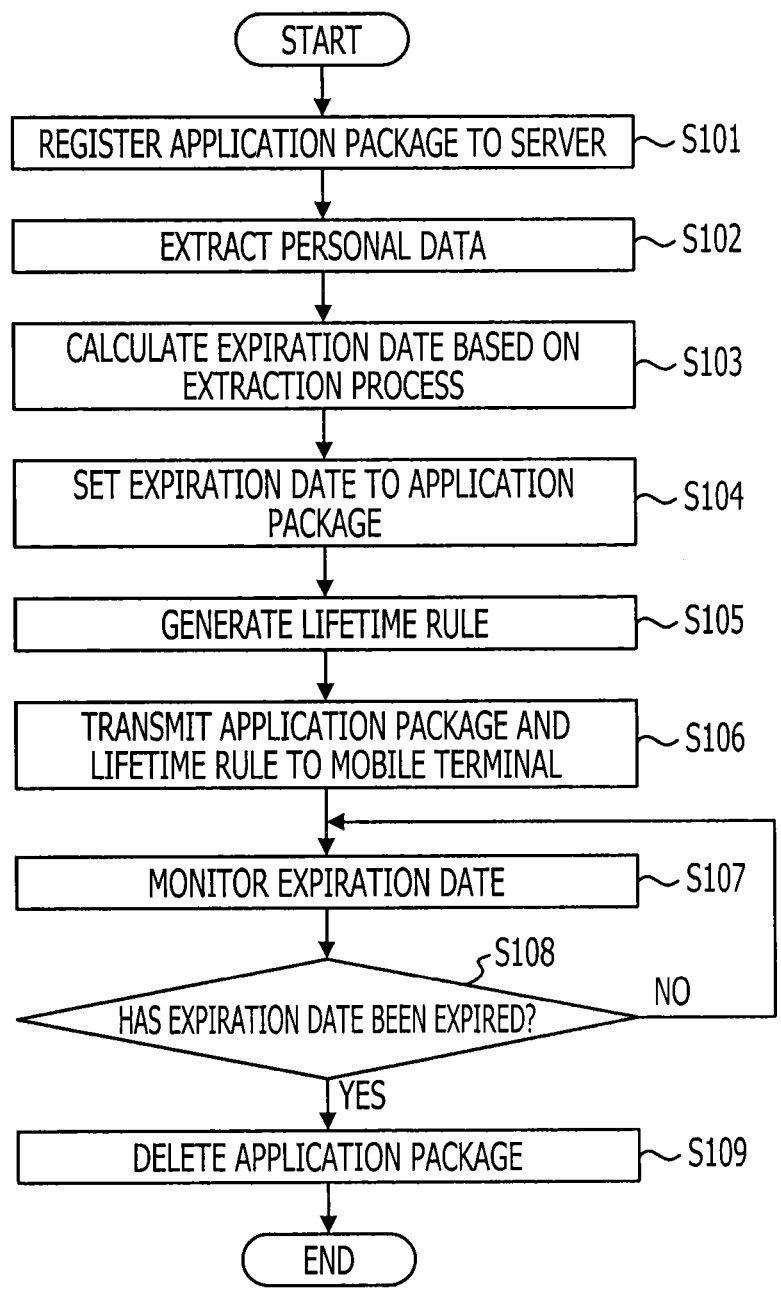
FIG. 8 is a flowchart illustrating a process of the application server.

FIG. 8 is a flowchart indicating a process of the application server 200.

In S101, the application registration unit 222 registers the application package 100 to the hard disk 213. In the application registration unit 222, the process proceeds to S102.

In S102, the personal data extraction unit 224 extracts personal data from the application package 100 registered to the hard disk 213. In the personal data extraction unit 224, the process proceeds to S103.

In S103, the lifetime calculation unit 226 calculates an expiration date of the application package 100 based on the extraction process of personal data in S102. In the lifetime calculation unit 226, the process proceeds to S104. The detailed process of the lifetime calculation unit 226 is described with reference to FIG. 9.

In S104, the lifetime setting unit 228 sets the expiration date calculated in S103 to the application package 100. In the lifetime setting unit 228, the process proceeds to S105.

In S105, the lifetime setting unit 228 generates a lifetime rule. In the lifetime setting unit 228, the process proceeds to S106.

In S106, the communication unit 236 transmits the application package 100 to which the expiration date is set and the lifetime rule 106 to the mobile terminal 300. In the communication unit 236, the process proceeds to S107. As described with reference to FIG. 11 later, the communication unit 236 may transmit the personal data 120 to the mobile terminal 300.

In S107, the lifetime monitoring unit 230 obtains time information indicated by the timer 232 and monitors the expiration date set to the application package 100. In the lifetime monitoring unit 230, the process proceeds to S108.

In S108, the lifetime monitoring unit 230 determines whether or not the expiration date set to the application package 100 has become expired, based on the obtained time information. When the expiration date set to the application package 100 has become expired, in the lifetime monitoring unit 230, the process proceeds to S109. On the other hand, when the expiration date set to the application package 100 is not expired, in the lifetime monitoring unit 230, the process returns to S107.

In S109, an elimination unit 214 deletes the application package 100 stored in the hard disk 213. In the elimination unit 214, the process ends.

Figure 9:
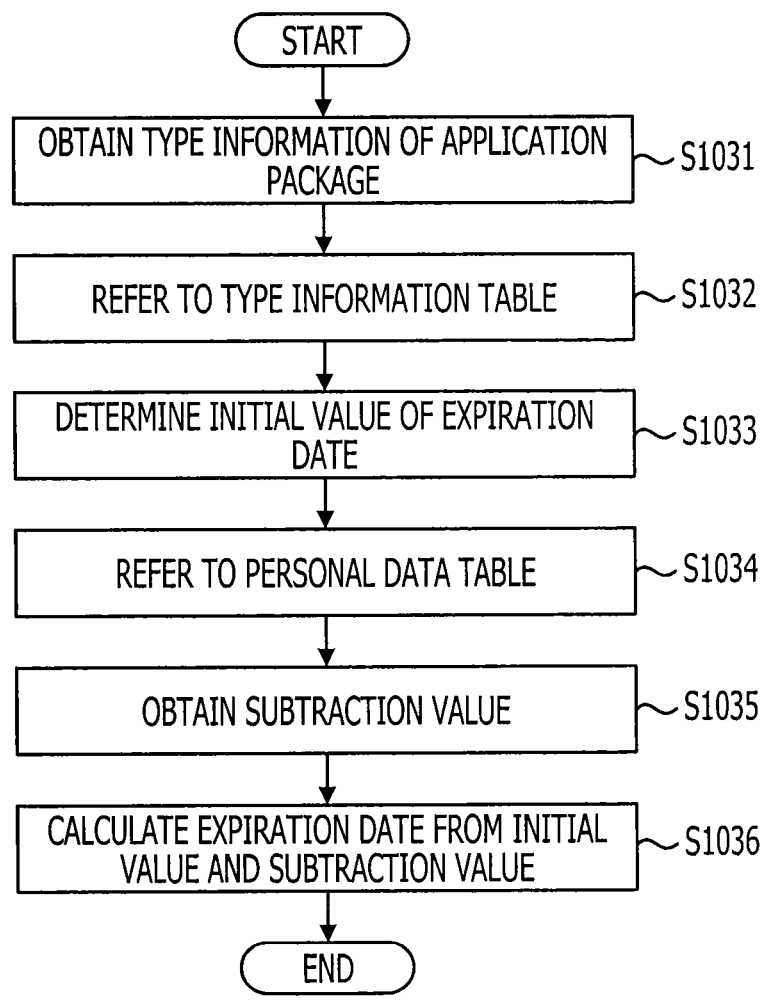
FIG. 9 is a flowchart illustrating a process of a lifetime calculation unit.

FIG. 9 is a flowchart indicating a process of the lifetime calculation unit.

In S1031, the lifetime calculation unit 226 obtains type information of the application package 100 by referring to the application package 100 stored in the hard disk 213. In the lifetime calculation unit 226, the process proceeds to S1032.

In S1032, the lifetime calculation unit 226 obtains an initial value of an expiration date of the application package 100 based on the type information of the application package 100 obtained in S1031 by referring to the type information table 110. In the lifetime calculation unit 226, the process proceeds to S1033.

In S1033, the lifetime calculation unit 226 determines the initial value of the expiration date of the application package 100. The lifetime calculation unit 226 determines the initial value of the expiration date of the application package 100 as "60 minutes" by referring to the type information table 110 because the type of the application package 100 in the embodiment is "business trip request". In the lifetime calculation unit 226, the process proceeds to S1034.

In S1034, the lifetime calculation unit 226 refers to the personal data table 120. In the lifetime calculation unit 226, the process proceeds to S1035.

In S1035, the lifetime calculation unit 226 obtains a subtraction value. In the embodiment, the application package 100 includes the items of business traveler 1020, departure place 1022, destination place 1024, contents 1026, and authorizer 1028, and the obtains, by referring to the personal data table 120, the subtraction value "3 minutes" corresponding to the item of business traveler 1020, the subtraction value "0 minute" corresponding to the item of departure place 1022, the subtraction value "5 minutes" corresponding to the item of destination place 1024, the subtraction value "10 minutes" corresponding to the item of contents 1026, and the subtraction value "3 minutes" corresponding to the item of authorizer 1028. In addition, the lifetime calculation unit 226 obtains the subtraction value "7 minutes" corresponding to the combination of the items of business traveler 1020 and destination place 1024 because the application package 100 includes the item of "business traveler 1020 and destination place 1024". In the lifetime calculation unit 226, the process proceeds to S1036.

In S1036, the lifetime calculation unit 226 calculates an expiration date of the application package 100 from the initial value determined in S1033 and the subtraction value obtained in S1035. In the embodiment, the lifetime calculation unit 226 calculates "32 minutes" obtained by subtracting the subtraction value "28 minutes" from the initial value "60 minutes", as the expiration date of the application package 100. In the lifetime calculation unit 226, the process ends.

Figure 10:
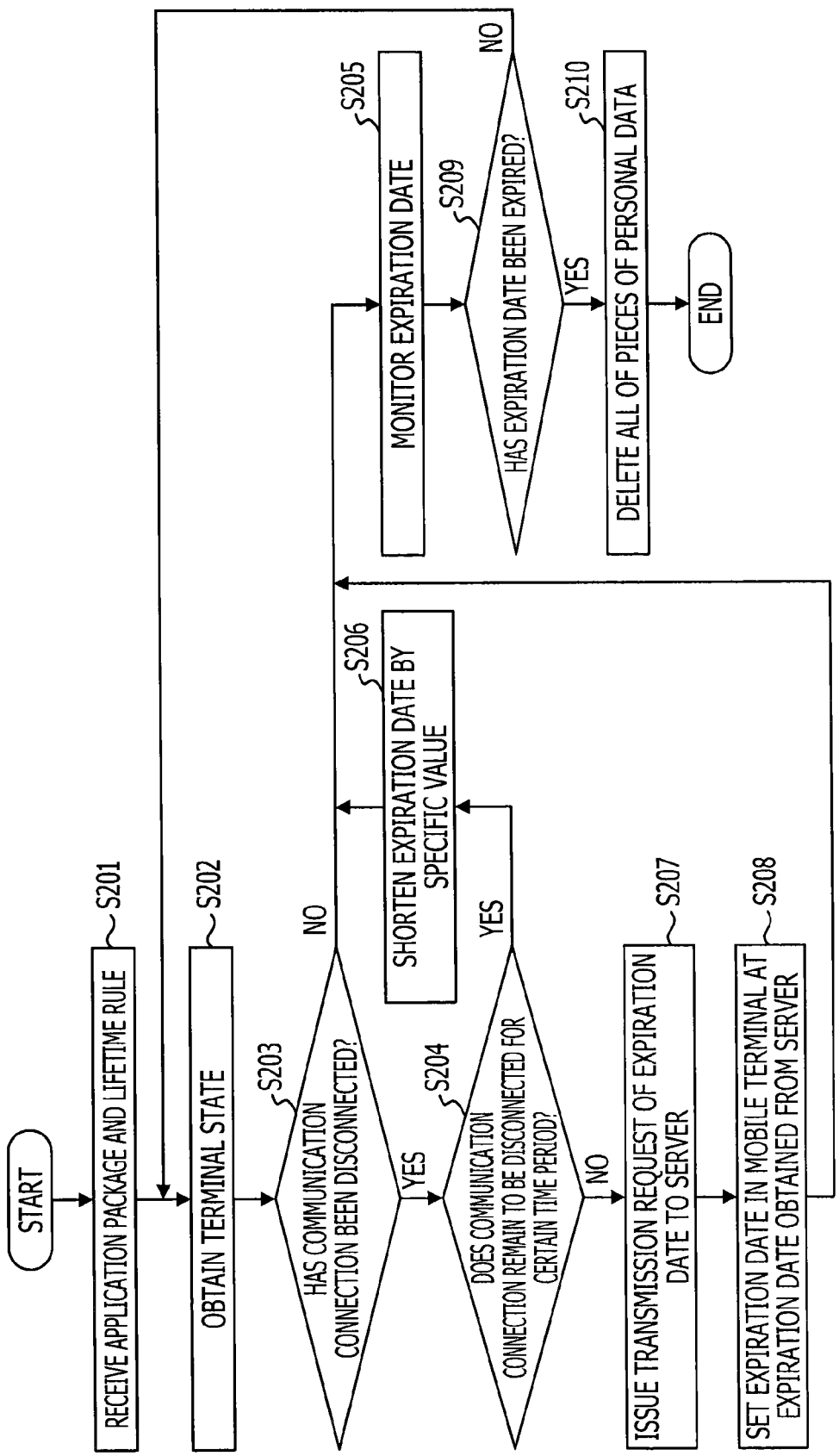
FIG. 10 is a flowchart illustrating a first process of the mobile terminal.

FIG. 10 is a flowchart indicating a process of the mobile terminal.

In S201, the communication unit 316 receives the application package 100 and the lifetime rule 106 from the application server 200. The communication unit 316 stores the received application package 100 and lifetime rule 106 in the flash memory 313. In the communication unit 316, the process proceeds to S202.

In S202, a terminal monitoring unit 310 obtains the terminal state of the mobile terminal 300. In the terminal monitoring unit 310, the process proceeds to S203.

In S203, the terminal monitoring unit 310 determines whether or not the communication connection between the mobile terminal 300 and the application server 200 has been disconnected, based on the communication state of the communication unit 316. When the communication connection between the mobile terminal 300 and the application server 200 has been disconnected, in the terminal monitoring unit 310, the process proceeds to S204. On the other hand, when the communication connection between the mobile terminal 300 and the application server 200 is not disconnected, in the terminal monitoring unit 310, the process proceeds to S205.

In S204, the terminal monitoring unit 310 determines whether or not the communication connection between the mobile terminal 300 and the application server 200 remains to be disconnected for a certain time period, based on the communication state of the communication unit 316. When the communication connection between the mobile terminal 300 and the application server 200 remains to be disconnected for a certain time period, in the terminal monitoring unit 310, the process proceeds to S206. On the other hand, when the communication connection between the mobile terminal 300 and the application server 200 has been established within a certain time period again, in the terminal monitoring unit 310, the process proceeds to S207.

In S206, the lifetime monitoring unit 330 shortens the expiration date set to the application package 100 by a specific value. In the lifetime monitoring unit 330, the process proceeds to S205. When the communication connection remains to be disconnected for a certain time period, the occurrence of information leakage in the mobile terminal 300 may be reduced by shortening the expiration date set to the application package 100 by a specific value.

In S207, the terminal monitoring unit 310 issues a transmission request of an expiration date of the application package 100 in the application server 200, to the application server 200, through the communication unit 316. In the terminal monitoring unit 310, the process proceeds to S208.

In S208, the terminal monitoring unit 310 receives the expiration date of the application package 100 in the application server 200, from the application server 200 through the communication unit 316. In addition, the lifetime monitoring unit 330 sets the expiration date of the application package 100 in the mobile terminal 300 at the expiration date of the application package 100 in the application server 200. In the lifetime monitoring unit 330, the process proceeds to S205. Even when the communication connection between the mobile terminal 300 and the application server 200 has been disconnected for a certain time period and the expiration date set to the application package 100 in the mobile terminal 300 has been shortened, in a case in which the communication connection is reconnected, the application package 100 in the mobile terminal 300 is allowed to be returned to the normal state by setting the expiration date of the application package 100 in the mobile terminal 300 at the expiration date of the application package 100 in the application server 200.

In S205, the lifetime monitoring unit 330 obtains time information indicated by the timer 332 and monitors the expiration date set to the application package 100. In the lifetime monitoring unit 330, the process proceeds to S209.

In S209, the lifetime monitoring unit 330 determines whether or not the expiration date set to the application package 100 has become expired, based on the obtained time information. When the expiration date set to the application package 100 has become expired, in the lifetime monitoring unit 330, the process proceeds to S210. On the other hand, when the expiration date set to the application package 100 is not expired, in the lifetime monitoring unit 330, the process returns to S202.

In S210, the elimination unit 334 deletes all of the pieces of personal data 104 that are stored in the flash memory 313. In the elimination unit 334, the process ends.

Figure 11:
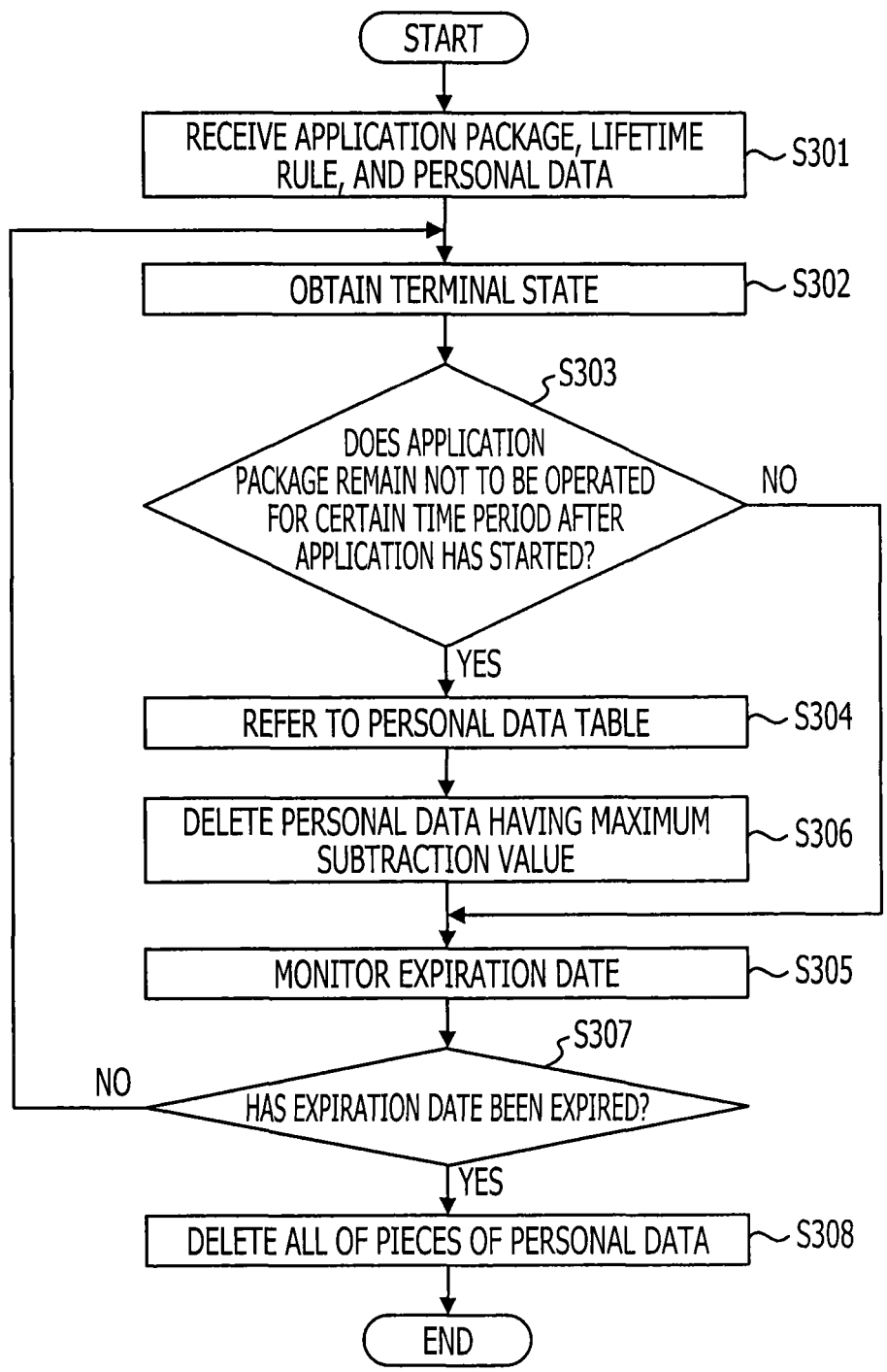
FIG. 11 is a flowchart illustrating a second process of the mobile terminal.

FIG. 11 is a flowchart indicating a process of the mobile terminal. In FIG. 10, the case is described in which the communication connection between the mobile terminal 300 and the application server 200 has been disconnected, and in FIG. 11, a case is described in which the application package 100 remains not to be operated for a certain time period in the mobile terminal 300.

In S301, the communication unit 316 receives the application package 100, the lifetime rule 106, and the personal data 120 from the application server 200. The communication unit 316 stores the received application package 100, lifetime rule 106 and personal data 120, in the flash memory 313. In the communication unit 316, the process proceeds to S302.

In S302, the terminal monitoring unit 310 obtains the terminal state of the mobile terminal 300. In the terminal monitoring unit 310, the process proceeds to S303.

In S303, the terminal monitoring unit 310 determines whether or not the application package 100 remains not to be operated for a certain time period after the application package 100 has been started. When the application package 100 remains not to be operated for a certain time period, in the terminal monitoring unit 310, the process proceeds to S304. On the other hand, when the application package 100 has been operated within a certain time period, in the terminal monitoring unit 310, the process proceeds to S305.

In S304, the terminal monitoring unit 310 refers to the personal data table 120. In the terminal monitoring unit 310, the process proceeds to S306.

In S306, the elimination unit 334 deletes personal data having a maximum subtraction value from the application package 100, based on the personal data table 120. In the terminal monitoring unit 310, the process proceeds to S305. The personal data having a maximum subtraction value is deleted from the application package 100 in order to delete personal data having high importance, thereby reducing the occurrence of information leakage in the mobile terminal 300.

In S305, the lifetime monitoring unit 330 obtains time information indicated by the timer 332 and monitors the expiration date set to the application package 100. In the lifetime monitoring unit 330, the process proceeds to S307.

In S307, the lifetime monitoring unit 330 determines whether or not the expiration date set to the application package 100 has become expired, based on the obtained time information. When the expiration date set to the application package 100 has become expired, in the lifetime monitoring unit 330, the process proceeds to S308. On the other hand, when the expiration date set to the application package 100 is not expired, in the lifetime monitoring unit 330, the process returns to S302.

In S308, the elimination unit 334 deletes all of the pieces of personal data 104 that are stored in the flash memory 313. In the elimination unit 334, the process ends.

As described above, the exemplary information processing system according to the embodiment is described, and the embodiment is not limited to the above-described information processing system and various modifications and changes may be made without departing from the scope of the claims.

For example, the lifetime calculation unit 226 may set a time that elapses before the user leaves a shopping center that is a certain area, at a default value of an expiration date of an application package. In addition, when the user purchase a product in a store, the lifetime setting unit 228 may set a lifetime rule so as to delete an advertisement of another product belonging to the same industry as the product that is purchased by the user.

For example, the lifetime monitoring unit 330 may extend an expiration date of the application package when the balance remains after the user has purchased a product in a store. In addition, the lifetime monitoring unit 330 may extend an expiration date of an application package when the user has purchased products in a plurality of stores in a shopping center in the past. In addition, the lifetime monitoring unit 330 may set an expiration date of the application package at "X minutes" when X minutes is left before the closing time of a store. In addition, the lifetime monitoring unit 330 may delete an advertisement when the balance does not remain after the user has purchased a product in a store.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
    a server device including a processor configured to
        determine an expiration date of an application based on a type of the application and a weight corresponding to personal information that is processed by the application; and
        transmit the application and the expiration date to a terminal device which is configured to receive the application and the expiration date, delete the received application based on the expiration date, and delete personal information having maximum importance among pieces of the personal information included in the received application when the application is not operated for a given time period after the application has been started in the terminal device.

2. The information processing system according to claim 1, wherein the terminal device is configured to:
    change the expiration date of the application based on a state of the terminal device, and
    delete the application received from the server device based on the changed expiration date.

3. The information processing system according to claim 2, wherein
    the changing the expiration date includes shortening the expiration date of the application when a connection between the terminal device and the server device is disconnected.

4. The information processing system according to claim 3, wherein the terminal device is configured to:
    receive the expiration date from the server device when the communication between the terminal device and the server device is established after the communication between the terminal device and the server device is disconnected; and set the expiration date of the application as the expiration date received from the server device.

5. The information processing system according to claim 1, wherein the weight corresponding to the personal information is set based on an importance of the personal information.

6. A server device communicates with a terminal device and distributes an application, the server device comprising:
   a memory; and
   a processor that executes a process in the memory, the process including:
      determining an expiration date of the application based on a type of the application and a weight corresponding to personal information that is processed by the application; and
      transmitting the application and the expiration date to the terminal device, wherein the terminal device is configured to delete personal information having maximum importance among pieces of the personal information included in the application when the application is not operated for a given time period after the application has been started in the terminal device.

7. The server device according to claim 6, wherein the weight corresponding to the personal information is set based on an importance of the personal information.

8. A terminal device communicates with a server device that distribute an application, the terminal device comprising:
   a memory; and
   a processor that executes a process in the memory, the process including:
      receiving the application and an expiration date from the server device, the expiration date being determined based on a type of the application and a weight corresponding to personal information that is processed by the application;
      deleting the received application based on the expiration date; and
      deleting personal information having maximum importance among pieces of the personal information included in the application when the application is not operated for a given time period after the application has been started in the terminal device.

9. The terminal device according to claim 8, wherein the weight corresponding to the personal information is set based on an importance of the personal information.

\* \* \* \* \*